United States Patent
Lampainen et al.

(10) Patent No.: US 12,234,605 B2
(45) Date of Patent: Feb. 25, 2025

(54) LIGHT WEIGHT LINERBOARD FOR CORRUGATED BOARD

(71) Applicant: Stora Enso OYJ, Helsinki (FI)

(72) Inventors: Seppo Lampainen, Lahti (FI); Janne Myllykangas, Kaarenkylä (FI); Petri Paakkanen, Vantaa (FI); Atso Laakso, Varkaus (FI); Kaj Backfolk, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 305 days.

(21) Appl. No.: 17/757,602

(22) PCT Filed: Dec. 11, 2020

(86) PCT No.: PCT/IB2020/061801
§ 371 (c)(1),
(2) Date: Jun. 17, 2022

(87) PCT Pub. No.: WO2021/124040
PCT Pub. Date: Jun. 24, 2021

(65) Prior Publication Data
US 2023/0019391 A1 Jan. 19, 2023

(30) Foreign Application Priority Data
Dec. 19, 2019 (SE) .................. 1951507-1

(51) Int. Cl.
| | | |
|---|---|---|
| *D21F 11/12* | (2006.01) | |
| *B32B 3/28* | (2006.01) | |
| *B32B 7/12* | (2006.01) | |
| *B32B 29/00* | (2006.01) | |
| *B32B 29/08* | (2006.01) | |
| *D21F 1/02* | (2006.01) | |
| *D21F 3/02* | (2006.01) | |
| *D21F 11/04* | (2006.01) | |

(52) U.S. Cl.
CPC .............. *D21F 11/12* (2013.01); *B32B 3/28* (2013.01); *B32B 7/12* (2013.01); *B32B 29/005* (2013.01); *B32B 29/08* (2013.01); *D21F 1/02* (2013.01); *D21F 3/0218* (2013.01); *D21F 11/04* (2013.01); *B32B 2250/26* (2013.01); *B32B 2262/062* (2013.01); *B32B 2307/538* (2013.01); *B32B 2307/718* (2013.01); *B32B 2307/72* (2013.01); *B32B 2307/75* (2013.01)

(58) Field of Classification Search
CPC .......... D21F 11/12; D21F 1/02; D21F 3/0218; D21F 11/04; D21F 9/00; D21F 1/028; D21F 9/006; D21H 27/38; D21H 27/40; B32B 3/28; B32B 7/12; B32B 29/005; B32B 29/08; B32B 2250/26; B32B 2262/062; B32B 2307/538; B32B 2307/718; B32B 2307/72; B32B 2307/75; B32B 2250/03; B32B 2264/102; B32B 2264/104; B32B 2307/50; B32B 2307/54
See application file for complete search history.

(56) References Cited

U.S. PATENT DOCUMENTS

| | | | | |
|---|---|---|---|---|
| 3,936,339 | A * | 2/1976 | Lock ....................... | B32B 27/18 156/205 |
| 4,134,781 | A * | 1/1979 | Carstens ................. | B32B 29/08 156/75 |
| 4,145,246 | A | 3/1979 | Goheen et al. | |
| 5,080,758 | A * | 1/1992 | Horng ..................... | D21H 27/38 162/149 |
| 5,169,496 | A * | 12/1992 | Wagle .................... | D21C 9/185 162/125 |
| 6,190,500 | B1 | 2/2001 | Mohan et al. | |
| 6,221,212 | B1 * | 4/2001 | Sjostrom ................ | D21H 27/38 162/149 |
| 7,070,865 | B2 * | 7/2006 | Berube ................... | C08K 5/0091 524/577 |
| 7,754,049 | B2 * | 7/2010 | Edwards ............... | D21F 3/0281 162/111 |
| 10,145,068 | B2 * | 12/2018 | Hans ...................... | D21H 11/08 |
| 10,787,770 | B2 | 9/2020 | Heiskanen et al. | |

(Continued)

FOREIGN PATENT DOCUMENTS

| | | |
|---|---|---|
| CN | 104452477 A | 3/2015 |
| CN | 104805737 A | 7/2015 |

(Continued)

OTHER PUBLICATIONS

International Search Report from corresponding PCT application No. PCT/IB2020/061801, mailed on Feb. 19, 2021.
Wen Liu, Production Processes of Small Paper Plants, Agricultural Publishing House, May 1992, pp. 143-143.
Junyan Huang, Processing and Test Technology of Packaging Paper, Printing Industry Press, Jan. 2009, p. 122.
Chinese Office Action from corresponding Chinese application No. 202080088798.3, issued on May 19, 2023.
Kirwan, Mark J., Paper and Paperboard Packaging Technology, Blackwell Publishing 2005.

(Continued)

*Primary Examiner* — Jose A Fortuna
(74) *Attorney, Agent, or Firm* — Greer, Burns & Crain, Ltd.

(57) ABSTRACT

The invention relates to a method to produce a linerboard exhibiting a high bending resistance and a high compression strength, which in turn provides high resistance to interflute buckling and sagging in a thereof formed corrugated board. This is achieved by the inventive combination of an optimized fiber refining level of the furnish in each layer of the linerboard, the separate formation of the top layer and the use of a multi-layer headbox to form the two-layered ply. In addition, the linerboard made according to the invention provides good printing properties in a thereof produced corrugated board, especially in flexographic printing, without the fluting structure being negatively affected.

22 Claims, No Drawings

(56) References Cited

U.S. PATENT DOCUMENTS

| | | | |
|---|---|---|---|
| 2002/0162636 A1 | 11/2002 | Halmschlager et al. | |
| 2010/0252215 A1 | 10/2010 | Kylliainen et al. | |
| 2011/0120644 A1* | 5/2011 | Chiu | D21J 1/08 156/324 |
| 2015/0114581 A1* | 4/2015 | Kinnunen | D21F 11/002 162/158 |
| 2017/0051456 A1* | 2/2017 | Hans | D21H 17/29 |
| 2018/0266054 A1* | 9/2018 | Henaff | D21H 11/04 |
| 2021/0002830 A1* | 1/2021 | Hietaniemi | D21H 17/29 |
| 2023/0019391 A1* | 1/2023 | Lampainen | B32B 3/28 |

FOREIGN PATENT DOCUMENTS

| | | | | |
|---|---|---|---|---|
| CN | 110088220 A | | 8/2019 | |
| CN | 117222793 A | * | 12/2023 | B65D 65/40 |
| CN | 114901904 B | * | 3/2024 | B32B 29/005 |
| DE | 19526205 A1 | | 1/1997 | |
| DE | 19526205 C2 | * | 8/2000 | D21B 1/32 |
| DE | 102011083308 A1 | | 3/2013 | |
| EP | 0312512 A1 | | 4/1989 | |
| EP | 1994223 B1 | * | 10/2013 | D21H 27/30 |
| EP | 4286584 B1 | * | 4/2024 | B32B 29/005 |
| FR | 2995325 A1 | | 3/2014 | |
| JP | 2009235636 A | | 10/2009 | |
| JP | 2023507126 A | * | 2/2023 | D21H 27/00 |
| MY | 131659 A | * | 12/1994 | B29C 17/04 |
| RU | 2743392 C2 | * | 2/2021 | D21F 11/00 |
| SE | 2151254 A1 | * | 6/2021 | D21F 11/04 |
| SE | 543829 C2 | * | 8/2021 | B32B 29/005 |
| WO | 9516070 | | 6/1995 | |
| WO | WO-9516070 A1 | * | 6/1995 | D21F 11/04 |
| WO | 2012041392 A1 | | 4/2012 | |
| WO | 2013041341 A1 | | 3/2013 | |
| WO | WO-2015036932 A1 | * | 3/2015 | B32B 29/005 |
| WO | 2017046086 A1 | | 3/2017 | |
| WO | 2017163176 A1 | | 9/2017 | |
| WO | WO-2018054957 A1 | * | 3/2018 | D21F 11/00 |
| WO | WO-2018083590 A1 | * | 5/2018 | B32B 29/002 |
| WO | 2019180303 A1 | | 9/2019 | |
| WO | WO-2021124040 A1 | * | 6/2021 | B32B 29/005 |

OTHER PUBLICATIONS

Extended European Search Report from corresponding European application No. EP20910402.6 dated Dec. 13, 2023.

* cited by examiner

LIGHT WEIGHT LINERBOARD FOR CORRUGATED BOARD

This application is a U.S. National Phase under 35 U.S.C. § 371 of International Application No. PCT/IB2020/061801, filed Dec. 11, 2020, which claims priority under 35 U.S.C. §§ 119 and 365 to Swedish Application No. 1951507-1, filed Dec. 19, 2019.

TECHNICAL FIELD

The present invention relates to a method to produce a linerboard for corrugated board, a linerboard, use of said linerboard and a corrugated board comprising said linerboard.

BACKGROUND

Corrugated board is a packaging material which can be converted to different types of packaging solutions. The corrugated board is a fiber based material comprising a corrugated medium (fluting) and at least one facing or linerboard attached onto a surface of the fluted medium, thus forming a sandwich structure. The central paper layer, called corrugated medium, is formed by using heat, moisture and pressure, into a corrugated shape using a corrugator. One or two facings, called liners, are glued to the tips of the corrugated medium. The sandwich can be formed in different ways such as in single, double, and triple walls as described in Kirwan M., J., Paper and Paperboard. Packaging Technology, Blackwell Publishing 2005.

There are different kinds of corrugated board grades, and these might comprise different types of liners and corrugated medium. Examples of different types of liners are kraftliner, white top kraftliner and testliner. Kraftliner is typically produced from kraft pulp that can be bleached or unbleached and may comprise one or more plies wherein the top layer/ply is often optimized to provide good printing surface and good moisture resistance. Testliner is mainly produced from recycled old corrugated board and is mostly done in two plies. Kraftliners are frequently used in corrugated packages with higher demands on strength properties.

Environmental concerns have increased the demand for linerboards with lighter weight, thus consuming less raw material. However, decreasing the grammage of linerboards might affect the strength properties negatively. To avoid problems with interflute buckling and sagging, it is crucial that the linerboard exhibits high bending resistance as well as high compression strength. The problem of interflute buckling occurs when the liner plies of a corrugated structure buckle under load, thus weakening the structure strength. Sagging is a result of deformation of the bottom part of corrugated package under load. In addition, linerboards of lower grammages may be more prone to cause problems with washboarding and bad printability. "Washboarding" or the "wash-board effect" is an undesired effect resulting from the corrugated board manufacturing process which might become even more visible after printing of the surface. The washboard effect is usually associated with the interfacial glue spreading/absorption and shrinkage of the glue between the liner and the fluting during drying. As the adhesive dries the liner may take up the silhouette of the flutes causing a washboard appearance.

Another challenge connected to the use of lightweight linerboards and flutings is to achieve good printing properties in flexographic printing of a thereof produced corrugated board, but yet maintain the fluting structure intact.

SUMMARY

It is an object of the present invention to provide a lightweight linerboard which exhibits high strength properties and which eliminates or alleviates at least some of the disadvantages of the use of the prior art lightweight linerboards in corrugated board. More specific objects include providing a linerboard and a corrugated board having higher resistance against interflute buckling and washboard and which also provides good printing properties when printed using flexographic printing, inkjet- and offset printing.

The invention is defined by the appended independent claims. Embodiments are set forth in the appended dependent claims and in the following description.

In a first aspect, the invention relates to a method to produce a linerboard, which method comprises the steps of:
  forming a top ply, comprising a first layer, by supplying a first furnish onto a first forming fabric of a paperboard machine, wherein the first furnish is ejected from a first headbox,
  forming a two-layered ply, comprising a second layer and a third layer, by supplying a second and a third furnish onto a second forming fabric, wherein the second and third furnish is ejected from a multi-layer headbox,
  couching said top ply and said two-layered ply together so that said second layer is arranged between said first layer and said third layer, forming a multi-ply web,
  dewatering and drying said multi-ply web,
  wherein the first and third furnish exhibit a first SR-value according to ISO 5267-1 of between 22-80, preferably of between 24-50, the second furnish exhibits a second SR according to ISO 5267-1 of less than 30, preferably less than 25, and wherein the first SR-value is at least 2 units higher than the second SR-value.

A linerboard made by the method of the invention exhibits a high bending resistance and a high compression strength, which in turn provides high resistance to interflute buckling and sagging in a thereof formed corrugated board. This is achieved by the inventive combination of an optimized fiber refining level of the furnish in each layer of the linerboard, the separate formation of the top layer and the use of a multi-layer headbox to form the two-layered back ply. In addition, the linerboard made according to the invention provides good printing properties in a thereof produced corrugated board, especially in flexographic printing, without the fluting structure being negatively affected. The bulky middle layer gives rise to high compressibility, whereby the undesired effects of dot gain and stresses to fluting will be mitigated during the printing process. The structure further reduces the surface roughness, which further enhances the printing properties.

In a second aspect, the invention relates to a linerboard comprising a top ply comprising a first layer and a two-layered ply comprising a second and a third layer, wherein
  the first layer and the third layer are made from furnishes exhibiting an SR-value according to ISO 5267-1 of between 22-80, preferably of between 24-50,
  the second layer is made from a furnish exhibiting an SR value according to ISO 5267-1 of less than 30, preferably less than 25, wherein the first SR-value is at least 2 units higher than the second SR-value,
  the two-layered ply comprising the second and third layer is formed by use of a multi-layer headbox, the second layer is located between the first layer and the third layer, and wherein the linerboard exhibits an SCT index (CD) according to ISO 9895 of at least 20 Nm/g, preferably at least 23 Nm/g, and a bending resistance index GM according to ISO 2493-1 of at least 7 Nm$^6$/kg$^3$.

In a third aspect, the invention relates to a corrugated board comprising a fluting and a linerboard according to the linerboard of the second aspect.

The invention further relates to the use of the linerboard of the second aspect in the production of a corrugated board to reduce interflute buckling tendency.

MEASUREMENT AND EVALUATION METHODS

The following methods and evaluation methods are referred to in the description and in the patent claims.

Shopper Riegler (SR) value is measured according to ISO 5267-1. The SR is measured for the fiber furnish after refining, for never-dried and refined pulp.

SCT index (CD) is measured according to ISO 9895.

Bending resistance index is measured at an angle of 15° by use of Lorentzen & Wettre instrument in accordance with ISO 2493-1. The bending resistance index is measured in MD and CD. The Bending resistance index geometric mean (GM) is calculated as the square root of the product of the bending resistance index in CD and MD.

Scott Bond is measured in accordance with Tappi T569.

Burst index is measured in accordance with ISO 2758.

Density is measured in accordance with ISO 534:2005

Bendtsen roughness is measured according to ISO 8791-2

The grammage or basis weight refers to the weight expressed as grams per square meter, gsm or g/m$^2$ and is measured in accordance with ISO 536. As used herein, gsm and g/m$^2$ may be used interchangeable.

Tensile stiffness index is measured according to ISO 1924-3. The tensile stiffness index geometric mean (GM) is calculated as the square root of the product of the tensile stiffness index in MD and CD.

All measurements are done at conditions according to ISO 187 unless otherwise stated.

DETAILED DESCRIPTION

"Multilayer headbox" as used herein defines a headbox comprising several (at least two) separate CD distribution channels. The headbox nozzle is equipped with separation vanes to prevent the layers from mixing. The headbox is preferably a hydraulic type headbox.

"Furnish" as used herein defines a furnish comprising cellulose fibers and potentially fillers and additives conventionally used in linerboard production.

"Fillers" as used herein is meant to define inorganic fillers preferably made from natural minerals, including but not limited to ground calcium carbonate (GCC), kaolin, precipitated calcium carbonate (PCC), talc and titanium dioxide.

"Microfibrillated cellulose (MFC)" as used herein is meant to define nano scale cellulose particle fiber or fibril with at least one dimension less than 1000 nm. MFC comprises partly or totally fibrillated cellulose or lignocellulose fibers. The liberated fibrils have a diameter less than 1000 nm, whereas the actual fibril diameter or particle size distribution and/or aspect ratio (length/width) depends on the source and the manufacturing methods. There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates The present invention discloses a method to produce a linerboard comprising a top ply and a two-layered ply. The linerboard of the invention is preferably produced in a conventional Fourdrinier machine fitted with two forming units and a first and a second headbox, whereof the second headbox is a multi-layer headbox.

The top ply is, according to the invention, formed from a first furnish by ejecting the first furnish from a first headbox onto a first forming fiber. The consistency of the furnish in the first head-box may be below 0.35%, preferably around 0.1-0.2%.

In a second step, a two-layered ply, comprising a second and a third layer, is formed from a second and a third furnish by ejecting the second and the third furnish from a multi-layer headbox onto a second forming wire. The two layered ply is preferably formed by ejecting the furnishes from the multi-layer headbox so that the third layer is formed on the second forming wire and the second layer is formed upon the third layer. The consistency of the furnishes in the multi-layer headbox may be below 0.45%, preferably around 0.2-0.35%.

The top ply and the two-layered ply are thereafter couched together to form a multi-ply web so that the second layer is arranged between the first layer and the third layer. The top ply and the two-layered ply may be dewatered, preferably to a solid content of more than 7 wt %, such as between 10-15 wt %, before the couch.

After the couch, the multi-ply web may enter a press section, which removes additional water, typically to a solid content of around 37-42 wt %. The press section may comprise at least one shoe press unit, preferably two or three shoe press units. The multi-ply web may be further dried by use of conventional drying technologies. The speed of the paperboard making machine used in connection with the invention could be up to 1300 m/s in the wet end.

The method of the invention is further characterized in that the first and the third furnish, forming the first and third layer, exhibits a first SR-value according to ISO 5267-1 of between 22-80, preferably of between 24-50, most preferably of between 24-30 or 22-26 or 24-26. The second furnish, forming the second layer (middle layer), exhibits a second SR according to ISO 5267-1 of less than 30, preferably less than 25 or less than 23, or less than 21, such as between 15-23 or 17-22. In accordance with the invention, the first SR-value is at least 2 units higher than the second SR-value, preferably at least 5 units higher or at least 7 units higher. The invention further discloses a linerboard produced according to the method and a corrugated board comprising said linerboard.

The separate formation of the top ply and the two-layered ply, comprising the second and third layer, in accordance with the invention counteracts that the finer material of the top ply is mixed with the coarser material of the second layer of the two-layered ply. In this way, the surface roughness of the linerboard is reduced which improves the printability of the board. The inventors of the present invention have further found that a linerboard needs to exhibit both a high bending resistance and a high SCT index (CD) value in order to reduce interflute buckling tendency in a thereof formed corrugated board. The linerboard of the invention may exhibit a bending resistance index (GM) according to ISO 2493-1 of the linerboard of at least 7 Nm$^6$/kg$^3$, preferably at least 9 Nm$^6$/kg$^3$, and most preferably at least 10 Nm$^6$/kg$^3$ and/or an SCT index (CD) according to ISO 9895 of at least 20 Nm/g, preferably at least 23 Nm/g, and most preferably at least 24 Nm/g. The SCT index (CD) may e.g. be between 20-40 Nm/g or 24-30 Nm/g. The bending resistance index (GM) may e.g. be between 7-20 $Nm^6/kg^3$ or 9-20 $Nm^6/kg^3$. The bending resistance index MD is preferably at least 12 $Nm^6/kg^3$ or at least 13.5 $Nm^6/kg^3$, or at least 15 $Nm^6/kg^3$. The bending resistance index CD is preferably at least 5 $Nm^6/kg^3$ or at least 6 $Nm^6/kg^3$ or at least 7 $Nm^6/kg^3$. The linerboard may further exhibit a tensile stiffness index GM of at least 5.8 kNm/g, preferably of at least 6 kNm/g and most preferably of at least 6.1 kNm/g.

It has further been shown that, by use of the present invention, it is possible to produce a low-density linerboard and still achieve high strength properties, especially a high bending resistance and a high SCT index (CD) value. The density of the linerboard of the invention may be below 900 $kg/m^3$, preferably below 850 $kg/m^3$, and more preferably below 800 $kg/m^3$. The basis weight of the linerboard of the invention is preferably within the range of 80-225 gsm.

The linerboard produced according to the invention may further exhibit a Scott bond according to TAPPI T569 of at least 220 $J/m^2$, preferably of at least 250 $J/m^2$ or at least 270 $J/m^2$ and/or a burst index according to ISO 2758 of at least 4.5 $kPam^2/g$, preferably at least 4.8 $kPam^2/g$, most preferably 5 $kPam^2/g$.

According to one embodiment, the linerboard produced by the method of the invention comprises fillers in an amount of less than 5 wt %, preferably less than 4 wt %, or less than 3 wt %, as calculated on the total weight of said linerboard. In one embodiment, the linerboard comprises no fillers.

The method of producing the linerboard may further comprise a step of applying an adhesive to the top layer before the couching of the top ply and the two-layered ply so that the adhesive is located between the top layer and the second layer of the two-layered ply. Preferably, the adhesive comprises starch and optionally microfibrillated cellulose (MFC). In this way, the z-directional tensile strength and the delamination strength is enhanced. The adhesive may be applied using non-impact methods, such as spraying or curtain coating. The adhesive may comprise starch in an amount of 50-100 wt %, preferably 70-99 wt % calculated on the total dry weight of the adhesive. In one embodiment, the adhesive also comprises microfibrillated cellulose (MFC) in an amount of 1-100 wt % dry weight, preferably in an amount of 1-30 wt %. The use of MFC inbetween the plies enables less interlayer mixing, which gives rise to enhanced stiffness properties. In one embodiment, the adhesive further comprises a pulp fraction comprising cellulose fibers and fines, which pulp fraction exhibits and SR-value of between 60-90, preferably between 70-90. The adhesive may comprise the pulp fraction in an amount of 1-100 wt % or in an amount of 1-30 wt %. The use of a pulp fraction with this specific SR-value counteracts interlayer mixing, while it still does not form a too tight film which could induce cracks at the drying of the board. The fine fraction may e.g. be the reject fraction received from fractionation of pulp. Pulp may be fractionated into a coarser and a finer fraction, whereof the coarser fraction may be used in a middle layer in paperboard (such as linerboard) production and the finer fraction, exhibiting the SR-value of between 60-90, may be used in an adhesive between the paperboard plies.

In one embodiment, the multi-ply web is calendered in a calender section comprising at least one nip formed between a heated calender roll and a backing roll or belt, which nip forms the highest line-load of the calender section, which highest line-load is less than 100 kN/m, preferably less than 50 kN/m. With "highest line-load" as used in this context is meant the highest line-load used in any of the nips of the calender section. The calender section can comprise a soft nip calender and/or an extended nip calender such as a belt calender or an extra soft nip calender. The calender section can comprise several nips, such as two or three nips and can be on-line or of-line.

The structure of the linerboard of the invention enables the use of lower line loads in the calendaring and yet makes it possible to achieve a low surface roughness. In this way, the bulk and the bending resistance is still kept at a high level, also in embodiments where no or a small amount of CTMP is used in the second layer. To further improve the surface roughness, a high temperature can be used in the calendaring. The temperature of the heated calender roll may be in the range of 80-250° C., preferably in the range of 100-200° C.

In embodiments wherein the basis weight of the linerboard is between 80-135 gsm, the Bendtsen roughness according to ISO 8791-2 of the linerboard may be below 700 ml/min, preferably below 650 ml/min.

In embodiments wherein the basis weight of the linerboard above 135 gsm, such as between 135-225 gsm, the Bendtsen roughness according to ISO 8791-2 of the linerboard may be below 900 ml/min, preferably below 800 ml/min.

The linerboard of the invention may comprise unbleached or bleached pulp form hardwood or softwood, including unbleached or bleached chemical pulp, chemi-thermomechanical pulp (CTMP) and/or recycled pulp e.g. from OCC. In one embodiment, the first and third furnish, forming the first and third layer of the linerboard, comprises unbleached kraft pulp, and the second furnish, forming the second layer of the linerboard, comprises unbleached kraft pulp and/or chemi-thermomechanical pulp (CTMP) and/or recycled fibers. The second layer may further comprise broke. In a preferred embodiment, the first and third furnish, forming the first and third layer, comprises 100 wt % unbleached kraft pulp. The second layer may preferably comprise unbleached kraft pulp in an amount of 50-100 wt % and CTMP in an amount of 50-0 wt %. Preferably, the pulp used in all layers are made from virgin fibers, most preferably never dried pulp.

In one embodiment, the second furnish, forming the second layer of the linerboard, comprises less than 40 wt % CTMP or less than 30 wt % CTMP or less than 20 wt % CTMP, preferably less than 10 wt %, or less than 5 wt % or even less than 1 wt % CTMP. In one embodiment, the linerboard comprises no CTMP. Thanks to the method of the invention, a linerboard showing both low surface roughness and good stiffness properties can be achieved even if no or small amount of bulking fibers (CTMP) is used.

Preferably, the first layer of the linerboard form the top layer providing a printing surface, while the third layer form the back layer adapted to be attached to a corrugated medium. The second layer preferably forms a middle layer.

The invention further discloses a linerboard made in accordance with the method of the first aspect of the invention. The linerboard may be further characterized by the same features as the method.

The invention further discloses a corrugated board comprising a fluting and the linerboard of the invention. The corrugated board preferably comprises at least two liners and at least one corrugated medium, wherein at least one of the liners is made from the linerboard of the invention. The corrugated board may also comprise more than one corrugated mediums and more than two liners. The liner is attached to at least one surface of the corrugated medium by an adhesive. The linerboard of the present invention is intended to be used as a light-weight substitute to kraft liners and thus in high quality corrugated board.

The invention further discloses use of the linerboard in the production of a corrugated board to reduce interflute buckling tendency.

The invention claimed is:

1. A method to produce a linerboard, which method comprises the steps of:
   forming a top ply, comprising a first layer, by supplying a first furnish onto a first forming fabric of a paperboard machine, wherein the first furnish is ejected from a first headbox,
   forming a two-layered ply, comprising a second layer and a third layer, by supplying a second and a third furnish onto a second forming fabric, wherein the second and third furnish is ejected from a multi-layer headbox,
   couching said top ply and said two-layered ply together so that said second layer is arranged between said first layer and said third layer, thereby forming a multi-ply web,
   dewatering and drying said multi-ply web, and,
   calendering of the multi-ply web in a calender section comprising at least one nip formed between a heated calender roll and a backing roll or a belt, wherein the nip provides a highest line-load in the calender section and wherein said highest line-load is less than 50 kN/m,
   wherein the first and third furnish exhibit a first Schopper Riegler value (SR-value) according to ISO 5267-1 of between 22-80 and the second furnish exhibits a second Schopper Riegler value (SR-value) according to ISO 5267-1 of less than 30, and wherein the first SR-value is at least 2 units higher than the second SR-value.

2. The method according to claim 1, wherein the bending resistance index GM according to ISO 2493-1 of the linerboard is at least 7 $Nm^6/kg^3$, or the SCT index (CD) according to ISO 9895 of the linerboard is at least 20 Nm/g, or both.

3. The method according to claim 1, wherein the linerboard exhibits a Scott Bond according to TAPPI T569 of at least 220 $J/m^2$, or a burst index according to ISO 2758 of at least 4.5 $kPam^2/g$, or both.

4. The method according to claim 1, wherein a density of the linerboard is below 900 $kg/m^3$.

5. The method according to claim 1, wherein the linerboard comprises fillers in an amount of less than 5 wt %, as calculated on a total weight of said linerboard.

6. The method according to claim 1, further comprising a step of applying an adhesive to the top ply before the couching of the top ply and the two-layered ply so that the adhesive is located between the top ply and the second layer of the two-layered ply, wherein the adhesive comprises starch and optionally microfibrillated cellulose (MFC).

7. The method according to claim 6, wherein the adhesive further comprises a pulp fraction comprising cellulose fibers and fines, which pulp fraction exhibits an SR-value of between 60-90.

8. The method according to claim 1, wherein the step of dewatering said multi-ply web comprises pressing the web in a press-section comprising two shoe presses.

9. The method according to claim 1, wherein a temperature of the heated calender roll is in the range of 80-250° C.

10. The method according to claim 1, wherein a basis weight of the linerboard is in a range from ≥80 to ≤135 gsm and a Bendtsen roughness according to ISO 8791-2 of the linerboard is below 700 ml/min.

11. The method according to claim 1, wherein a basis weight of the linerboard is in a range from >135 to <225 gsm and a Bendtsen roughness according to ISO 8791-2 of the linerboard is below 900 ml/min.

12. The method according to claim 1, wherein the first and the third furnish, forming the first layer and the third layer, comprises unbleached kraft pulp, and wherein the second furnish, forming the second layer of the linerboard, comprises unbleached kraft pulp, or chemi-thermomechanical pulp (CTMP), or recycled fibers, or a combination thereof.

13. The method according to claim 10, wherein the second furnish, forming the second layer of the linerboard, comprises less than 20 wt % CTMP.

14. The linerboard according to claim 1, wherein a basis weight of the linerboard is in a range from >135 to <225 gsm and the Bendtsen roughness according to ISO 8791-2 of the linerboard is below 900 ml/min.

15. A linerboard comprising a top ply and a two-layered ply, wherein the top ply comprises a first layer and the two-layered ply comprises a second and a third layer, and wherein
   the first layer and the third layer are made from furnishes exhibiting a first SR-value according to ISO 5267-1 of between 22-80,
   the second layer is made from a furnish exhibiting a second SR-value according to ISO 5267-1 of less than 30,
   the two-layered ply, comprising the second and the third layer, is formed by use of a multi-layer headbox, wherein the first SR-value is at least 2 units higher than the second SR-value,
   the top ply is formed on a first forming fabric and the two-layered ply is formed onto a second forming fabric, which plies are couched together so that the second layer is located between the first layer and the third layer, and wherein
   the linerboard has been subjected to calendering in a calender section comprising at least one nip formed between a heated calender roll and a backing roll or belt, which nip provides the highest line-load in the calender section and wherein said highest nip-load is less than 50 kN/m, and wherein
   the linerboard exhibits an SCT index (CD) according to ISO 9895 of at least 20 Nm/g and a bending resistance index GM according to ISO 2493-1 of at least 7 $Nm^6/kg^3$.

16. The linerboard according to claim 15, wherein the linerboard exhibits a Scott bond according to TAPPI T569 of at least 220 $J/m^2$, or a burst index according to ISO 2758 of at least 4.5 $kPam^2/g$, or both.

17. The linerboard according to claim 15, wherein a density of the linerboard is below 900 $kg/m^3$.

18. The linerboard according to claim 15, further comprising an adhesive comprising starch and optionally MFC applied between said first layer of the top ply and said second layer of the two-layered ply.

19. The linerboard according to claim 18, wherein the adhesive further comprises a pulp fraction comprising cellulose fibers and fines, wherein the pulp fraction exhibits an SR-value of between 60-90.

20. The linerboard according to claim 15, wherein a temperature of the heated calender roll is in the range of 80-250° C.

21. The linerboard according to claim 15, wherein a basis weight of the linerboard is in a range from ≥80 to ≤135 gsm and the Bendtsen roughness according to ISO 8791-2 of the linerboard is below 700 ml/min.

22. A corrugated board comprising a fluting and a linerboard according to claim 15.

\* \* \* \* \*